United States Patent
Han et al.

(10) Patent No.: US 10,809,850 B2
(45) Date of Patent: Oct. 20, 2020

(54) TOUCH EVENT PROCESSING METHOD AND TOUCHSCREEN APPARATUS

(71) Applicant: SHENZHEN Hitevision Technology Co., Ltd., Shenzhen, Guangdong (CN)

(72) Inventors: Yen-Hao Han, Guangdong (CN); Hsiu-Fang Cheng, Guangdong (CN)

(73) Assignee: Shenzhen Hitevision Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/185,067

(22) Filed: Nov. 9, 2018

(65) Prior Publication Data

US 2019/0361562 A1 Nov. 28, 2019

(30) Foreign Application Priority Data

May 28, 2018 (CN) .......................... 2018 1 0520996

(51) Int. Cl.
*G06F 3/041* (2006.01)
*G06F 3/0354* (2013.01)

(52) U.S. Cl.
CPC ........ *G06F 3/0416* (2013.01); *G06F 3/03545* (2013.01)

(58) Field of Classification Search
CPC .......................... G06F 3/0416; G06F 3/03545
USPC ......................................................... 345/173
See application file for complete search history.

(56) References Cited

U.S. PATENT DOCUMENTS

| | | | | |
|---|---|---|---|---|
| 5,790,114 A | * | 8/1998 | Geaghan | G06F 3/0488 178/18.03 |
| 2014/0310631 A1 | * | 10/2014 | Harrison | G06F 3/0484 715/771 |
| 2015/0193037 A1 | * | 7/2015 | Masaki | G06F 3/03545 345/173 |

* cited by examiner

*Primary Examiner* — Amare Mengistu
*Assistant Examiner* — Gloryvid Figueroa-Gibson

(57) ABSTRACT

A touch event processing method, comprising: virtualizing a standard HID pen apparatus and a touch apparatus in an operating system; intercepting touch information sent by a physical touch apparatus so that the touch information is not directly received by the operating system; classifying the touch information, and sending, by using different virtual apparatuses based on the classification, the touch information to the operating system for processing. A user can directly touch, write and erase in the software based on past experience and impressions, does not need to search a toolbar for a required functional icon, and even does not need to open the toolbar.

20 Claims, 5 Drawing Sheets

TOUCH EVENT PROCESSING METHOD AND TOUCHSCREEN APPARATUS

CROSS-REFERENCE TO RELATED APPLICATION

This application claims priority to and the benefit of Chinese Patent Application No. 201810520996.7, filed on May 28, 2018, and the entire content of which is incorporated herein by reference.

BACKGROUND

Technical Field

The present invention relates to the field of touchscreens, and in particular, to a touch event processing method and a touchscreen apparatus.

Related Art

A touchscreen is a quite convenient human-computer interaction tool and has been universally used in intelligent display apparatuses of various uses. A current touchscreen may display a touch trajectory on a touchscreen surface or perform a next operation based on a received touch signal. In some software, the current touchscreen has a drawing or writing function. After the software is open, for example, a toolbar is generally disposed on a side of the touchscreen, or a floating toolbar is disposed on the touchscreen. And the toolbar includes tool boxes or functional boxes (which are generally icons) such as writing and eraser, when a user needs to edit content on the touchscreen, if the user needs to write or draw, he may click on the writing icon and then writes; if the user needs to erase writing, he may click on the eraser icon and then erases. In this way, when the user edits text or draws a picture, he needs to frequently switch between content input function and erasing function. This is quite inconvenient, affects input efficiency, and affects user experience. In addition, the user further needs to learn how to use the software, needs to read an operating instruction, and can be familiar with using the software only after a period of time.

For some software that the public are familiar with, for example, OFFICE software based on Windows system, such as WORD, the software currently has only simple touch functions by using the touchscreen, for example, functions of clicking on functional keys and sliding up and down. Writing, drawing and erasing cannot be directly performed in WORD by using the touchscreen.

SUMMARY

Therefore, a main objective of the present invention is to provide a touch event processing method, so that software having a standard HID defined function in a system can perform different instruction operations based on different touch signals. And a user can directly touch, write and erase in the software based on past experience and impressions, does not need to search a toolbar for a required functional icon, and even does not need to open the toolbar.

To achieve the foregoing objective, in one aspect, the present invention provides a touch event processing method, including the following steps: S101, virtualizing a standard HID pen apparatus and touch apparatus in an operating system (OS); S102, intercepting touch information sent by a physical touch apparatus so that the touch information is not directly received by the operating system; and S103, classifying the touch information, and sending, by using different virtual apparatuses based on the classification, the touch information to the operating system for processing.

Preferably, two thresholds T1 and T2 are preset, and T1<T2. T1 and T2 may be measured in units of physical length, or measured in units of coordinate value variation.

Preferably, the touch information includes: width-height value R and location information of a touch point. Alternatively, the width-height value R is touch area. The physical touch apparatus includes: a touch sensor and a touch integrated circuit (IC).

Preferably, the step S102 includes: obtaining control authority over signal transmission of the physical touch apparatus, and sending an instruction to the physical touch apparatus so that the touch apparatus converts the touch information into a non-standard information series to intercept the signal from the physical touch apparatus. Thus a signal from the physical touch apparatus is not directly sent to the operating system.

Preferably, the step S103 includes: when width-height value R of a touch point is less than T1, classifying the touch information as writing information and transmitting the touch information to the operating system by using writing function of the virtualized pen apparatus, where the operating system processes it into a standard pen writing input operation; when width-height value R of a touch point is between T1 and T2, classifying the touch information as single- or multi-touch information and transmitting the touch information to the operating system by using the virtualized touch apparatus, where the operating system processes it into a normal single- or multi-touch operation; when width-height value R of a touch point is greater than T2, classifying the touch information as erasing information and transmitting the touch information to the operating system by using erasing function of the virtualized pen apparatus, where the operating system processes it into an erasing operation.

Preferably, the operating system is Windows operating system.

Preferably, the touch event processing method is implemented in the form of driver software.

In another aspect, the present invention further provides a touchscreen apparatus, including a physical touch apparatus and an operating system module, and further including a driver module, where the driver module virtualizes a standard HID pen apparatus and a touch apparatus in the operating system module, intercepts the touch information sent by the physical touch apparatus, classifies the touch information, and sends, by using different virtual apparatuses based on the classification, the touch information to the operating system for processing.

In yet another aspect, the present invention further provides a driver module for a touchscreen, including a processor and a memory, where the memory is connected to the processor and stores instructions; the processor is configured to execute the instructions so that the processor can virtualize a standard HID pen apparatus and a touch apparatus in an operating system module, intercept touch information sent by a physical touch apparatus, classify the touch information, and send, by using different virtual apparatuses based on the classification, the touch information to the operating system for processing.

In yet another aspect, the present invention further provides a non-transitory computer readable storage medium storing instructions, when executed by a processor, causes the processor to virtualize a standard HID pen apparatus and a touch apparatus in an operating system module, intercept touch information sent by a physical touch apparatus, classify the touch information, and send, by using different virtual apparatuses based on the classification, the touch information to the operating system for processing. The non-transitory computer readable medium includes remote, local, mixed and/or removable storage devices.

DETAILED DESCRIPTION

The following describes preferred embodiments of the present invention in detail with reference to accompanying drawings.

In the present invention, a touchscreen is also referred to as a "touch screen" or a "touch panel", and is a sensing display apparatus that can display content to a user and can receive touch input. Based on media used by touchscreens and working principles, the common types of touchscreens are resistive, capacitive, infrared, surface acoustic wave, and the like. However, the touchscreen according to the present invention is not limited to the types of touchscreen.

In the present invention, width-height value R of a touch object touching the touchscreen refers to a width value and a height value of a touch point. The width value is an extreme value from the leftmost side to the rightmost side of the touch point and the height value is an extreme value from the uppermost side to the downmost side of the touch point. In some embodiments, the width-height value R may alternatively refer to a touch area, that is, an area size obtained by multiplying the width value by the height value.

Figure 1:
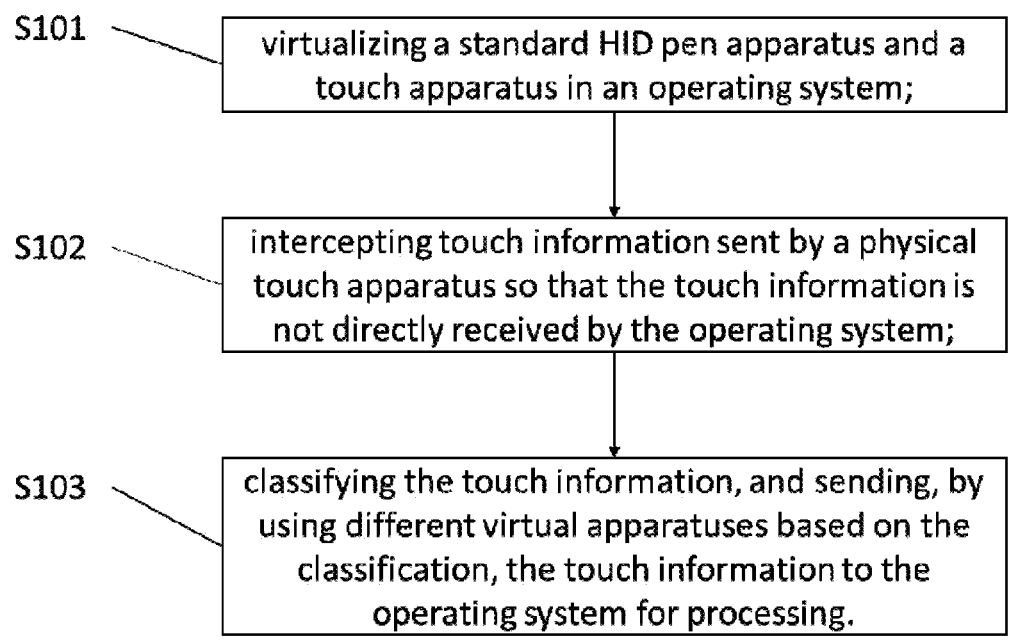
FIG. 1 is a flowchart of a touch event processing method for a touchscreen according to an embodiment of the present invention.

FIG. 1 is a flowchart of a touch event processing method for a touchscreen according to an embodiment of the present invention.

In step S101, a standard HID pen apparatus and a touch apparatus are virtualized in a system.

In an embodiment, the system may be a Windows operating system.

HID is an acronym for "human interface device" and is often referred to as a human input device. HID mainly refers to some human-computer interaction devices, generally provides an input method available to human, and may transmit output information to human HID devices include keyboard, mouse, joystick, pen apparatus, and the like, but the HID devices are not necessarily these human-computer interaction devices, and those devices that comply with HID specification requirement may be considered as the HID devices.

In one embodiment, a standard HID pen apparatus is virtualized in a system, and the virtualized pen apparatus is a pseudo device which simulates a hardware input device, that is, a pen. The virtualized pen apparatus may be considered as a normal hardware input device, that is, a pen, by the system. A specific implementation is as follows: a driver according to the present invention declares existence of the hardware, that is, the pen, to the system, and the system considers that hardware of a pen is connected, but the pen is invisible to a user.

In an embodiment, a touch apparatus is also virtualized in the system. In the present invention, all sent information of a physical touch apparatus is intercepted and original touch information cannot reach the operating system. But the present invention does not intend to make touch control capability disappear, but instead extend the touch control capability. Therefore, a virtualized touch apparatus is needed to ensure that touch control function still exist. This will be described in detail below.

In an embodiment, in a system, a cursor of a virtualized pen apparatus is displayed as a point on a screen; a cursor of a virtualized touch apparatus is displayed as a solid circle. The user can obviously see a difference. Certainly, the virtualized pen apparatus and touch apparatus may alternatively be displayed as other patterns. The present invention is not limited thereto.

In step S102, touch information sent by a physical touch apparatus is intercepted so that the touch information is not directly received by the system.

In brief, the physical touch apparatus is an apparatus that may reflect an action of pressing or clicking of an object (for example, a pen-like object, a finger, or a palm) to the system when the object (for example, the pen-like object, the finger, or the palm) touches a touchscreen surface. For touchscreens of different working principles, working manners of the physical touch apparatus are different. For example, for a capacitive touchscreen, the physical touch apparatus is a capacitive touch apparatus. There is a layer of transparent metal capacitive sensing mesh inside glass to sense self-contained electricity of the finger or the palm to locate a pressing position, then a circuit board controls and calculates the position. This is a set of capacitive physical touch apparatus. For an infrared touchscreen, the physical touch apparatus is an infrared touch apparatus. There is an infrared transmission array on four sides of a screen. Detection of infrared ray blocked by the finger or another object is used to locate a touch position, then similarly a circuit board controls and calculates the position. This is a set of infrared physical touch apparatus. The working principle and the structure of the physical touch apparatus are not limited in the present invention.

For easy description, the physical touch apparatus includes a touch sensor and a touch IC (that is, a touch chip). For different types of touchscreens, for example, infrared, ultrasonic, resistive, capacitive, and even optical touchscreens, actual touch sensors and touch ICs are different.

In brief, the touch IC is an operation chip which organizes the information sensed by the touch sensor then calculates and obtains coordinates and the width-height value R of the touch point of an object. Therefore, in an embodiment, the touch information sent by the physical touch apparatus includes information such as width-height value R and touch location information of touch points, etc. In another embodiment, the width-height value R of the touch points may alternatively be processed into an area value of the touch points, that is, is equal to multiplying a width value by a height value.

In the prior art, the physical touch apparatus directly sends the touch information to a system (for example, Windows operating system) for further processing. However, in the present invention, the touch information sent by the physical touch apparatus is intercepted so that the touch information is not directly received by the system.

In an embodiment, after a driver according to the present invention is installed and run on an intelligent device, control authority over signal transmission of the physical touch apparatus is obtained and a channel is established so that the signals from the physical touch apparatus is sent to only the driver according to the present invention and is no longer sent to the system (for example, Windows operating system).

In an embodiment, the driver according to the present invention sends an instruction to the physical touch apparatus, commands the physical touch apparatus to convert the touch information into a non-standard information series and send the series to the driver according to the present invention, and cuts off the channel for sending to the operating system. This is to prevent the operating system from processing the touch information if the touch information is identified by the system (for example, Windows operating system).

There may be further other methods that are not disclosed herein for intercepting the touch information of the physical touch apparatus, and this is not limited in the present invention.

In step S103, after the touch information sent by the physical touch apparatus is obtained, the touch information is classified and is sent, by using different virtual apparatuses based on the classification, to the system for processing.

In the present invention, two thresholds T1 and T2 may be preset. For example, T1 is set to 1 cm, and T2 is set to 3 cm. Here theses threshold values are merely an example, and the present invention is not limited thereto. In an embodiment, values of the thresholds T1 and T2 generally depend on an area size of the finger or palm of the user when he touches a screen during operation.

In another embodiment, additionally or alternatively, T1 and T2 may be set by the user when the driver starts. Alternatively, the values of T1 and T2 may be modified or adjusted according to actual situation by the user during use.

Figure 2:
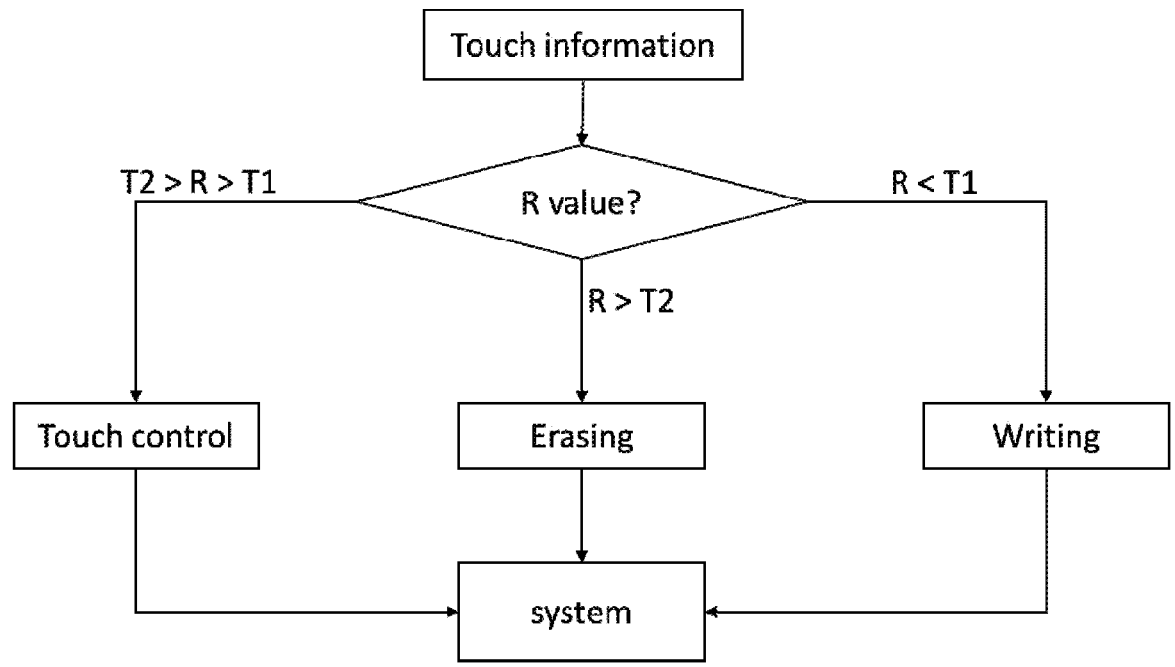
FIG. 2 shows details of step S103 in FIG. 1.

In an embodiment, the touch information may be classified into: writing information, single- or multi-touch information, and erasing information. Details of the step S103 is shown in FIG. 2.

As described above, the touch information sent by the physical touch apparatus includes the width-height value R touched by the finger or other objects, the touch location, and the like.

When the width-height value R of the touch point is less than T1 (for example, 1 cm), the touch is determined as writing information which is transmitted to the operating system by using a writing definition of the virtualized pen apparatus. And the operating system processes the touch into a standard writing input operation.

When the width-height value R of the touch points is between T1 (for example, 1 cm) and T2 (for example, 3 cm), the touch is determined as single- or multi-touch information which is transmitted to the operating system by using the virtualized touch apparatus. And the operating system processes the touch into a normal single- or multi-touch operation.

When the width-height value R of the touch point is greater than T2 (for example, 3 cm), the touch is determined as erasing information which is transmitted to the operating system by using an erasing definition of the virtualized pen apparatus, and the operating system processes the touch into an erasing operation.

The width-height value R described above may be replaced with a touch area value, so the values of the corresponding thresholds T1 and T2 are correspondingly different. In addition, the foregoing examples describe only "less than", "greater than" or "between", the present invention may alternatively include a case of "equal to". For example, when the width-height value R of the touch point is equal to T1, the touch may be determined as writing information, or may be determined as single- or multi-touch information. This is also true for T2. The present invention is not limited thereto.

In this way, the user can operate on a large touchscreen according to past usage habits: writing by using a fingertip or another pen apparatus or another stylus; clicking on and touching an icon by using finger pulp of a single finger (increasing a touch area) or performing multi-touch by using a plurality of fingers; or erasing by using a palm or a part of a palm or different parts of a palm.

During actual operation, the quantity of touch units corresponding to an actual width-height value may be calculated, and then compared with T1 and T2. A touch unit is a coordinate value variation. In a standard HID definition, a touch apparatus will inform operating system about related definition by using an HID descriptor. First the quantity of coordinate variations in a unit length needs to be calculated. That is, the quantity of touch units in a unit length needs to be calculated.

An actual calculation formula is $(LM-Lm)/((PM-Pm)*10^{-2})$, wherein $10^{-2}$ is 10 raised to the power of $-2$, and represents that the unit length is 1 cm. That is, the quantity of touch units every 1 cm needs to be calculated. PM represents a physical maximum, Pm represents a physical minimum, LM represents a logical maximum, and Lm represents a logical minimum. The physical maximum is a maximum that the touch apparatus can actually achieve, the logical maximum is a mapping value for a system. And the physical maximum depends on a definition of a touch solution provider, that is, how many touch units the provider can make in the physical maximum PM (that is, how may coordinate value variations). A physical meaning of the formula is: calculating the quantity of the coordinate variations in the unit length on an actual large screen.

As an example, the width of the touchscreen actually is 195 cm, and the height is 109.72 cm. Take width as an example, a physical maximum of the width defined by the apparatus is 19500 (represented by using PM), a logical maximum is 19500 (represented by using LM), and both a physical minimum (represented by using Pm) and a logical minimum (represented by using Lm) are 0. The foregoing formula is substituted with these values, an actual equation is 19500/(19500*0.01), and the result is 100. The value 100 represents that there are 100 touch units every 1 cm. This may be understood as a resolution ratio of a touch point. In this example, 100 coordinate value variations can be shown in 1 cm. Therefore, T1 value in this example is 100 (representing 1 cm), and T2 value is 300 (representing 3 cm).

Figure 3:
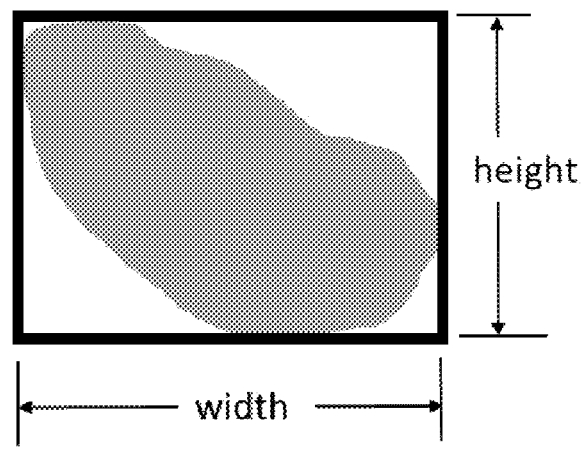
FIG. 3 is a schematic diagram of a width-height value of a touch point.

FIG. 3 is a schematic diagram of a width-height value of touch point. When a touch apparatus is detecting a touch, an extreme value from the leftmost side to the rightmost side of the touch point is used as a width value, and an extreme value from the uppermost side to the downmost side of the touch point is used as a height value. As shown in FIG. 3, the actual touch point is the grey central part in an irregular shape, and the width value and the height value of a quadrilateral frame surrounding the irregular shape are width-height value R sent by the touch apparatus.

Through the foregoing descriptions of the embodiments, a person skilled in the art may understand that various methods according to the embodiments may be implemented by only software, hardware, or software plus a necessary universal hardware platform. However, in most cases, the first choice is using the form of driver software. Based on the such understanding, the technical solutions of the present invention in essence, or the contributing part to the related art is implemented in the form of a software product. The software product is stored in a storage medium (for example, a ROM/RAM, a magnetic disk or an optical disk) and includes instructions for instructing a terminal apparatus (which may be a large touchscreen, a mobile phone, a computer, or the like) to perform the methods described in the embodiments of the present invention.

Figure 4:
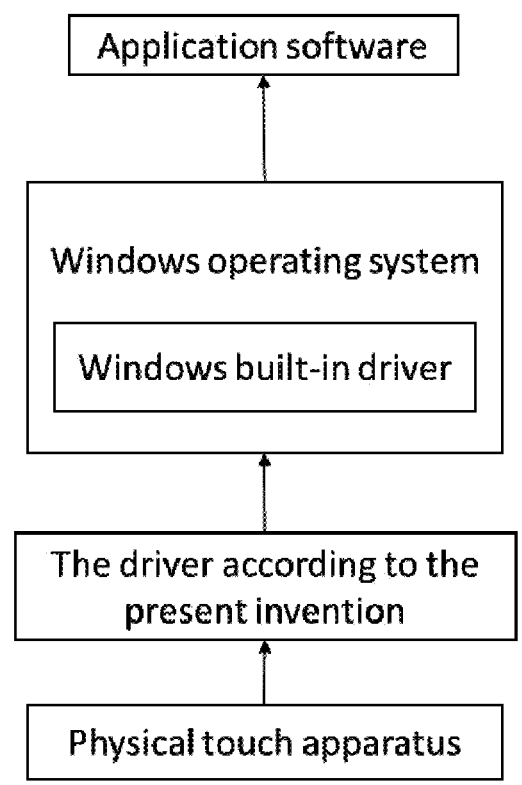
FIG. 4 is a block diagram of a touchscreen system according to an embodiment of the present invention.

FIG. 4 is a block diagram of a touchscreen system according to an embodiment of the present invention, and shows a hierarchical relationship between a driver, touch apparatus hardware, and an operating system in the present invention.

The driver according to the present invention is an add-on to the operating system. After the driver according to the present invention is loaded, the driver first virtualizes a pen apparatus and a touch apparatus, then intercepts touch information of a physical touch apparatus, then classifies the touch information based on a touch area size, and sends the touch information to the operating system by using different virtual touch apparatuses based on the classification result. A Windows built-in driver is a driver already existing in Window system, and Windows has quite complete driven support for various different hardware apparatuses. Built-in drivers in FIG. 4 includes a driver of HID standard touch and a driver of a pen apparatus.

By using the driver according to the present invention, the touch apparatus may be enabled to have a capability for identifying a touch object, and the capability is embodied on an application software (for example, Microsoft edge, Office, whiteboard, FlatFrog whiteboard, and Avocor Whiteboard) through the operating system (for example, Windows operating system).

Figure 5:
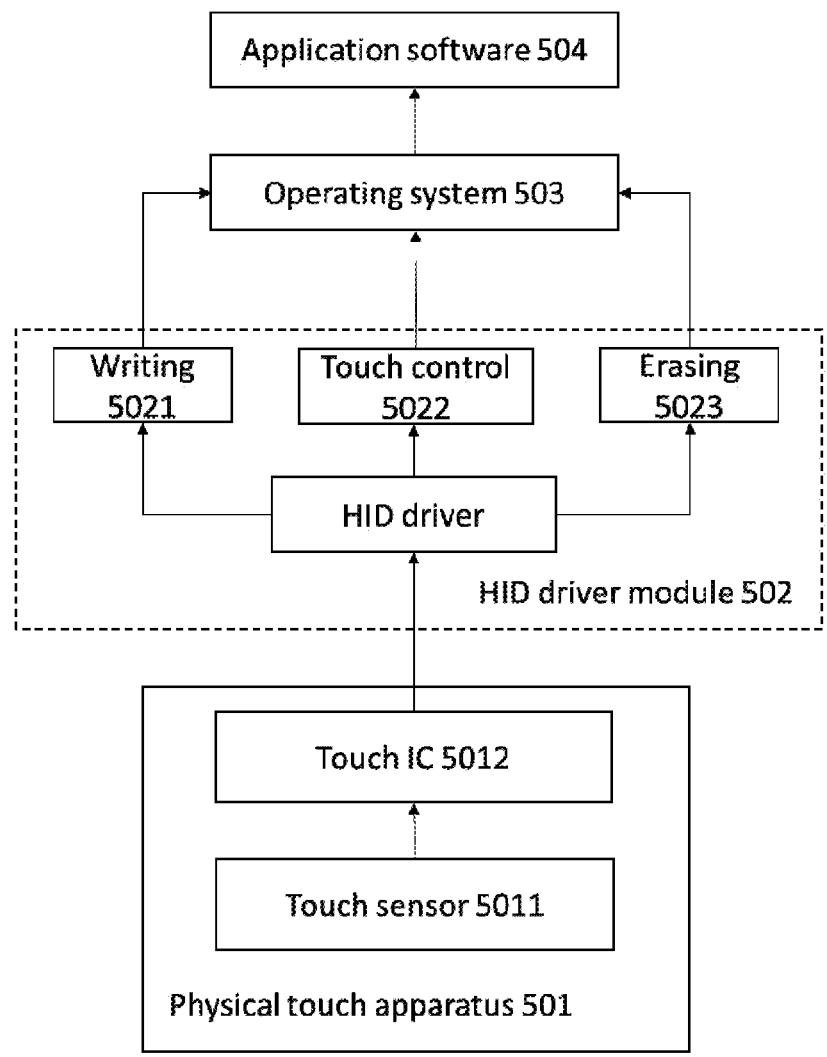
FIG. 5 is a detailed block diagram of a touchscreen system.

FIG. 5 is a detailed block diagram of a touchscreen system, including a physical touch apparatus 501, an HID driver module 502, an operating system 503, and application software 504. The HID driver module 502 according to the present invention is between the physical touch apparatus 501 and the operating system 503. The physical touch apparatus 501 includes a touch sensor 5011 and a touch IC 5012. The touch sensor 5011 senses a user's touch and generates a touch signal which is sent to the touch IC 5012. The touch IC 5012 is configured to process and calculate the signal from the touch sensor 5011 and generate information such as location coordinates of touch point and width-height value R. The HID driver module 502 according to the present invention may be configured to virtualize a pen apparatus and a touch apparatus, intercept touch information from the physical touch apparatus 501, classify the obtained touch information, and send the touch information to the operating system 503 by using different virtual touch apparatuses based on a classification result. The virtualized pen apparatus sends writing information 5021 (if the width-height value of the touch information is less than the threshold T1), the virtualized touch apparatus sends single- or multi-touch information 5022 (if the width-height value of the touch information is between the thresholds T1 and T2), and the virtualized pen apparatus sends erasing information 5023 (if the width-height value of the touch information is greater than the threshold T2). The operating system 503 processes it into a standard writing input operation, a single- or multi-touch operation, and an erasing operation in the application software 504 based on the received information.

Figure 6:
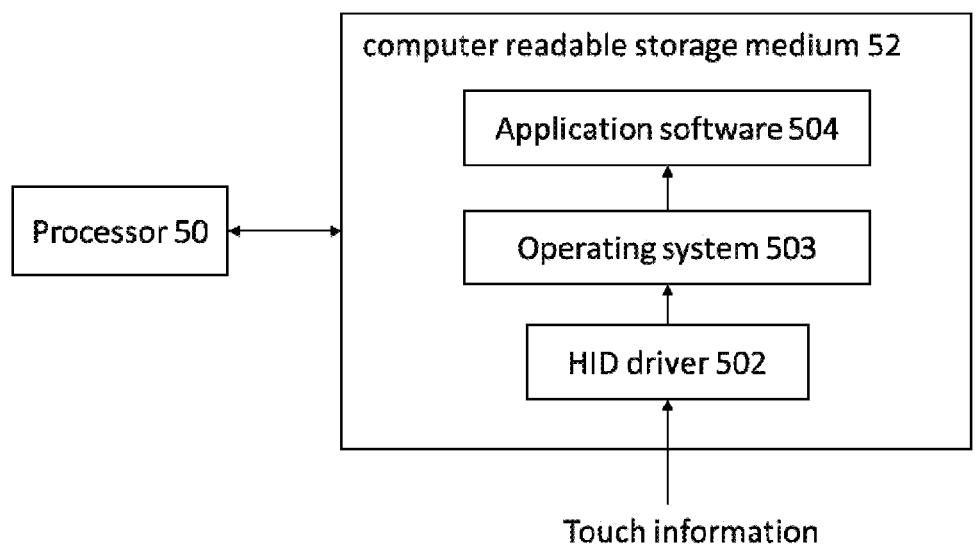
FIG. 6 is a block diagram of a computer system.

FIG. 6 is a block diagram of a computer system according to the present invention. The computer system includes one or more processors 50 and one or more computer readable media 52. The processor 50 may be configured to access the computer readable medium 52 via a bus. The processor 50 may be configured to execute software (for example, a program represented by one or more instructions) stored in the computer readable medium 52 (for example, a non-transitory computer readable storage medium). For example, the processor 50 may be configured to perform one or more operations shown in FIG. 1 and FIG. 2. As an illustrative and non-limiting example, the computer readable medium 52 may include one or more memory devices such as a RAM, a ROM, a magnetic disk or an optical disk, a hard disk, a flash memory, a network memory apparatus or a combination thereof.

Various software such as HID driver, operating system and application software may be stored in the computer readable medium 52. It should be understood that the HID driver or a part thereof may be implemented as code segments (for example, software, firmware and/or hardware logic) to perform the task and the function according to the present invention. These code segments may be operated by one or more processors 50 (for example, a CPU, an application-specific integrated circuit (ASIC), a programmable gate array (PGA) or one or more core processors of a multi-core processor) to provide operation of the embodiments of the present invention. The code segments may be stored in the computer readable medium 52. For example, the computer readable medium 52 may include any medium that can properly store information. The computer readable medium includes, for example, an electronic circuit, a semiconductor memory device, a read-only memory (ROM), a flash memory, an erasable ROM (EROM), a CD-ROM, an optical disk and a hard disk.

In other embodiments, the driver according to the present invention may be alternatively separately stored in a stand-alone non-transitory computer readable medium. After the computer readable medium is connected to a computer system, the driver according to the present invention may be installed in the computer operating system. Then each time the system is power on, the driver according to the present invention is automatically started.

In other embodiments, the driver according to the present invention may be alternatively in the form of a software installation package on a network, for a user to download the driver and then install the driver in his computer system.

That is, the non-transitory computer readable storage medium represents a remote, local, mixed and/or removable storage device.

It should be understood that the preferred embodiments above are merely used to describe the technical solutions of the present invention, and are not intended to limit the present invention. For a person skilled in the art, modifications may be made to the technical solutions recorded in the foregoing preferred embodiments, or equivalent replacements may be made on some of the technical features therein. These modifications or replacements shall fall within the protection scope of the claims of the present invention.

What is claimed is:

1. A touch event processing method, comprising the following steps:
   (S101) virtualizing a standard Human Interface Device (HID) pen apparatus and a touch apparatus in an operating system executed by a processor;

(S102) intercepting touch information sent by a physical touch apparatus so that the touch information is not directly received by the operating system but is received by a HID driver that intercepts the touch information, wherein the HID driver is executed by the processor; and (S103) classifying the touch information, and the HID driver sending, by using different virtual apparatuses based on a classification by the HID driver, the touch information to the operating system for processing;

wherein the touch information classified by the HID driver further comprises single-touch information of a single touch point.

2. The method according to claim 1, wherein two thresholds T1 and T2 are preset, and T1<T2, wherein the HID driver compares the touch information to the two thresholds T1 and T2 to generate the classification of the touch information.

3. The method according to claim 2, wherein T1 and T2 are measured in units of a physical length, or are measured in touch units per the physical length, wherein the touch information is in units of the physical length of a touch, or in touch units;

wherein the physical touch apparatus sends a HID descriptor that is intercepted by the HID driver and analyzed by the HID driver to determine a coordinate value variation as a quantity of touch units for comparison with the two thresholds T1 and T2.

4. The method according to claim 2, wherein the touch information comprises a width-height value R of the single touch point;

wherein the step (S103) comprises:

when the width-height value R of the touch point is less than T1, the HID driver classifying the touch information as writing information, and the HID driver transmitting the touch information to the operating system by using a writing function of the virtualized pen apparatus, wherein the operating system processes the touch event into a standard pen writing input operation;

when the width-height value R of the touch point is between T1 and T2, the HID driver classifying the touch information as single- or multi-touch information, and the HID driver transmitting the touch information to the operating system by using the virtualized touch apparatus, wherein the operating system processes the touch event into a normal single- or multi-touch operation; and when the width-height value R of the touch point is greater than T2, the HID driver classifying the touch information as erasing information, and the HID driver transmitting the touch information to the operating system by using an erasing function of the virtualized pen apparatus, wherein the operating system processes the touch event into an erasing operation.

5. The method according to claim 1, wherein the touch information comprises a width-height value R and location information of a touch point, and the width-height value R is alternatively a touch area.

6. The method according to claim 1, wherein the step (S102) comprises: the HID obtaining control authority over signal transmission of the physical touch apparatus so that a signal from the physical touch apparatus is intercepted by the HID driver executing on the processor and is not directly sent to the operating system.

7. The method according to claim 6, wherein obtaining control authority over signal transmission of the physical touch apparatus so that a signal from the physical touch apparatus is intercepted comprises: sending an instruction from the HID driver to the physical touch apparatus so that the touch apparatus converts the touch information into a non-standard information series to allow the HID driver to intercept the signal from the physical touch apparatus.

8. The method according to claim 1, wherein the physical touch apparatus comprises a touch sensor and a touch Integrated Circuit (IC).

9. The method according to claim 1, wherein the operating system is Windows® operating system.

10. The method according to claim 1, implemented in the form of driver software.

11. A touchscreen apparatus, comprising a physical touch apparatus and an operating system and a processor for executing instructions, further comprising a driver module executed by the processor, wherein the driver module virtualizes a standard Human Interface Device (HID) pen apparatus and a touch apparatus in the operating system, intercepts touch information sent by the physical touch apparatus, classifies the touch information, and sends, by using different virtual apparatuses based on a classification, the touch information to the operating system for processing;

wherein the touch information classified by the driver module further comprises single-touch information of a single touch point.

12. The apparatus according to claim 11, wherein two thresholds T1 and T2 are preset, and T1<T2, wherein the driver module compares the touch information to the two thresholds T1 and T2 to generate the classification of the touch information.

13. The apparatus according to claim 12, wherein T1 and T2 are measured in units of a physical length, or measured in touch units per the physical length, wherein the touch information is in units of the physical length of a touch that generates the touch information or in touch units;

wherein the physical touch apparatus sends a HID descriptor that is intercepted by the driver module and analyzed by the driver module to determine a coordinate value variation as a quantity of touch units for comparison with the two thresholds T1 and T2.

14. The apparatus according to claim 11, wherein the touch information comprises a width-height value R and location information of a touch point, and the width-height value R is alternatively a touch area.

15. The apparatus according to claim 14, wherein classifying the touch information, and sending, by using different virtual apparatuses based on the classification, the touch information to the operating system for processing comprises:

when a width-height value R of the touch point is less than T1, classifying the touch information as writing information, and transmitting the touch information to the operating system by using a writing function of the virtualized pen apparatus, wherein the operating system processes the touch event into a standard pen writing input operation;

when the width-height value R of the touch points is between T1 and T2, classifying the touch information as single- or multi-touch information, and transmitting the touch information to the operating system by using the virtualized touch apparatus, wherein the operating system processes the touch event into a normal single- or multi-touch operation; and when the width-height value R of the touch point is greater than T2, classifying the touch information as erasing information, and transmitting the touch information to the operating system by using an erasing function of the virtualized pen apparatus, wherein the operating system processes the touch event into an erasing operation.

16. The apparatus according to claim 11, wherein the intercepting comprises: obtaining control authority over signal transmission of the physical touch apparatus so that a signal from the physical touch apparatus is intercepted and is not directly sent to the operating system.

17. The apparatus according to claim 16, wherein obtaining control authority over signal transmission of the physical touch apparatus so that a signal from the physical touch apparatus is intercepted comprises: sending an instruction to the physical touch apparatus so that the touch apparatus converts the touch information into a non-standard information series to intercept the signal from the physical touch apparatus.

18. The apparatus according to claim 11, wherein the physical touch apparatus comprises a touch sensor and a touch Integrated Circuit (IC).

19. The apparatus according to claim 11, wherein the operating system is a Windows® operating system.

20. The apparatus according to claim 11, wherein the driver module is implemented in the form of driver software.

\* \* \* \* \*